United States Patent
Takeda (10) Patent No.: US 10,714,751 B2
(45) Date of Patent: Jul. 14, 2020

(54) NEGATIVE ELECTRODE FOR LITHIUM ION SECONDARY BATTERY AND LITHIUM ION SECONDARY BATTERY

(71) Applicant: NEC ENERGY DEVICES, LTD., Sagamihara-shi, Kanagawa (JP)

(72) Inventor: Kouzou Takeda, Kanagawa (JP)

(73) Assignee: Envision AESC Energy Devices, Ltd., Sagamihara-shi, Kanagawa (JP)

( * ) Notice: Subject to any disclaimer, the term of this patent is extended or adjusted under 35 U.S.C. 154(b) by 192 days.

(21) Appl. No.: 15/752,016

(22) PCT Filed: Sep. 21, 2016

(86) PCT No.: PCT/JP2016/077812
§ 371 (c)(1),
(2) Date: Feb. 12, 2018

(87) PCT Pub. No.: WO2017/057123
PCT Pub. Date: Apr. 6, 2017

(65) Prior Publication Data
US 2018/0241038 A1 Aug. 23, 2018

(30) Foreign Application Priority Data
Sep. 30, 2015 (JP) ................ 2015-193412

(51) Int. Cl.
| | | |
|---|---|---|
| *H01M 4/587* | (2010.01) | |
| *H01M 4/36* | (2006.01) | |
| *H01M 4/04* | (2006.01) | |
| *H01M 10/0525* | (2010.01) | |
| *H01M 10/0566* | (2010.01) | |
| *C01B 32/20* | (2017.01) | |
| *H01M 4/133* | (2010.01) | |
| *H01M 4/02* | (2006.01) | |

(52) U.S. Cl.
CPC ............ *H01M 4/587* (2013.01); *C01B 32/20* (2017.08); *H01M 4/0404* (2013.01); *H01M 4/133* (2013.01); *H01M 4/364* (2013.01); *H01M 4/366* (2013.01); *H01M 10/0566* (2013.01); *C01P 2004/51* (2013.01); *C01P 2004/61* (2013.01); *C01P 2004/80* (2013.01); *C01P 2006/10* (2013.01); *C01P 2006/12* (2013.01); *C01P 2006/40* (2013.01); *H01M 10/0525* (2013.01); *H01M 2004/021* (2013.01); *H01M 2004/027* (2013.01); *Y02E 60/122* (2013.01); *Y02T 10/7011* (2013.01)

(58) Field of Classification Search
CPC .. C01B 32/20; C01P 2004/51; C01P 2004/61; C01P 2004/80; C01P 2006/10; C01P 2006/12; C01P 2006/40; H01M 10/0525; H01M 10/0566; H01M 2004/021; H01M 2004/027; H01M 4/0404; H01M 4/133; H01M 4/364; H01M 4/366; H01M 4/587; Y02E 60/122; Y02T 10/7011
See application file for complete search history.

(56) References Cited

U.S. PATENT DOCUMENTS

2012/0251888 A1  10/2012  Yamamoto et al.

FOREIGN PATENT DOCUMENTS

| EP | 2 306 560 A1 | 4/2011 |
|---|---|---|
| JP | 08-138650 A | 5/1996 |
| JP | 2001-196095 A | 7/2001 |
| JP | 2005-294011 A | 10/2005 |
| JP | 2009-158496 A | 7/2009 |
| JP | 5270050 B1 | 8/2013 |
| JP | 5407196 B2 | 2/2014 |
| JP | 2014-067625 A | 4/2014 |
| JP | 2016-091632 A | 5/2016 |
| WO | 2010/113783 A1 | 10/2010 |

OTHER PUBLICATIONS

Communication dated Feb. 21, 2019 by the European Patent Office in application No. 16851297.8.
International Search Report of PCT/JP2016/077812 dated Nov. 15, 2016 [PCT/ISA/210].

*Primary Examiner* — Carlos Barcena
(74) *Attorney, Agent, or Firm* — Sughrue Mion, PLLC (57) ABSTRACT

A negative electrode for a lithium ion secondary battery including a current collector and a negative electrode active material layer on the current collector, wherein the negative electrode active material layer includes: a first composite particle with a first graphite core particle and a first non-graphite-based carbon material coating a surface thereof; and a second composite particle with a second graphite core particle and a second non-graphite-based carbon material coating a surface thereof, and wherein an average particle diameter of the first composite particles is 5-30 μm; an average particle diameter of the second composite particles is 2-25 μm, and is smaller than the average particle diameter of the first composite particles; the mixing ratio of the first composite particle A and the second composite particle B is 50:50-95:5 in mass ratio; and a density of the negative electrode active material layer is 1.4-1.7 g/cm$^3$.

18 Claims, 1 Drawing Sheet

NEGATIVE ELECTRODE FOR LITHIUM ION SECONDARY BATTERY AND LITHIUM ION SECONDARY BATTERY

CROSS REFERENCE TO RELATED APPLICATIONS

This application is a National Stage of International Application No. PCT/JP2016/077812, filed Sep. 21, 2016, claiming priority based on Japanese Patent Application No. 2015-193412, filed Sep. 30, 2015, the contents of all of which are incorporated herein by reference in their entirety.

TECHNICAL FIELD

The present invention relates to a negative electrode for a lithium ion secondary battery, and a lithium ion secondary battery.

BACKGROUND ART

Lithium ion secondary batteries, since being high in the energy density and excellent in the charge and discharge cycle characteristics, are broadly used as power sources for small-size mobile devices such as cell phones and laptop computers. Further in recent years, in consideration of the environmental problem and in growing concern for the energy saving, there have been raised demands for large-size batteries requiring a high capacity and a long life, in electric cars and hybrid electric cars, power storage fields and the like.

Lithium ion secondary batteries are generally constituted mainly of a negative electrode containing, as a negative electrode active material, a carbon material capable of occluding and releasing lithium ions, a positive electrode containing, as a positive electrode active material, a lithium composite oxide capable of occluding and releasing lithium ions, a separator separating the negative electrode and the positive electrode, and a nonaqueous electrolyte solution in which a lithium salt is dissolved in a nonaqueous solvent.

As carbon materials to be used as the negative electrode active material, amorphous carbon and graphite are used; particularly in the applications requiring a high energy density, graphite is usually used and various types of graphite-based materials are being developed.

For example, Patent Literature 1 discloses, as a negative electrode material for a lithium ion battery, a composite graphite particle having a core material composed of a graphite and a carbonaceous layer present on its surface. Patent Literature 1 describes that the carbonaceous layer is obtained by adhering an organic compound on a core material and heat-treating it at 500° C. or higher; the amount of the carbonaceous layer is 0.05 to 10 parts by mass with respect to 100 parts by mass of the core material; and the composite graphite particle has a BET specific surface area of 0.2 to 30 $m^2/g$. Patent Literature 1 describes that the composite graphite particle has a high acceptability of lithium ions; and use thereof enables providing the lithium ion battery good in the cycle characteristics and the output and input characteristics.

Patent Literature 2 discloses that in a nonaqueous electrolyte secondary battery, a negative electrode containing mixed graphite particles of coated graphite particles coated with an amorphous carbon and non-coated graphite particles coated with no amorphous carbon is used.

Patent Literature 2 describes that the mass of the amorphous carbon in 100 parts by mass of the coated graphite particles is 0.1 to 10 parts by mass, and the specific surface area of the mixed graphite particles of the coated graphite particles and the non-coated graphite particles is 2 to 5 $m^2/g$. Patent Literature 2 describes that use of such mixed graphite particles enables suppressing deposition of lithium during high-rate charge and suppressing the cycle deterioration due to a decrease in the internal resistance of the negative electrode.

Patent Literature 3 discloses a mixed carbon material containing a carbon material A and a carbon material B, wherein both of the carbon material A and the carbon material B are each composed of a core material composed of a graphite powder and a surface carbon substance (at least one of an amorphous carbon and a turbostratic carbon) adhering on or coating a part of its surface. Then Patent Literature 3 describes that the compression density of the carbon material A is 1.80 to 1.90 $g/cm^3$, the compression density of the carbon material B is 1.45 to 1.65 $g/cm^3$, and the compression density of the mixed carbon material is 1.75 to 1.84 $g/cm^3$; and the average particle diameter of the carbon material B is 7 μm or larger and 14 μm or smaller, and is smaller than that of the carbon material A; and the specific surface area of the carbon material A is 4 $m^2/g$ or smaller, and the specific surface area of the carbon material B is 6 $m^2/g$ or smaller. Patent Literature 3 describes that a lithium ion secondary battery using such a mixed carbon material, while having a high negative electrode density and thereby having a high capacity, achieves a high charging acceptability and additionally has a small irreversible capacity.

Then, Patent Literature 4 describes that when the packing density of a negative electrode is made high by pressing in order to improve the capacity of the negative electrode, since the vicinity of the negative electrode surface is excessively compressed and the size of voids in the surface vicinity becomes smaller than that in the interior, resultantly causing a nonaqueous electrolyte solution to hardly permeate into the negative electrode, the amount of the electrolyte solution held by the negative electrode becomes insufficient, resultantly bringing about the deterioration of the charge and discharge cycle characteristics of a secondary battery. Then Patent Literature 4 describes that in order to solve such a problem, the negative electrode is fabricated by a method comprising a step of applying and thereafter drying a coating containing a fibrous carbonaceous material and a graphitic material on a current collector to thereby form an active material-containing layer having a density of 1.0 to 1.3 $g/cm^3$, and a step of raising the density of the active material-containing layer to 1.3 to 1.6 $g/cm^3$ by pressing. Patent Literature 4 describes that by thus fabricating the negative electrode, since the sizes of voids in the active material-containing layer of the negative electrode can be made uniform, the charge and discharge cycle life of the secondary battery can be improved.

Further Patent Literature 5 discloses a carbonaceous electrode plate for a nonaqueous electrolyte solution secondary battery composed of a carbonaceous molding sheet having a density distribution or a porosity distribution in the sheet thickness direction, and having a higher density or a lower porosity in the interior portion than in the outer surface portion. Patent Literature 5 describes that such a carbonaceous electrode plate is an excellent negative electrode in which the outer surface portion exhibits the performance as the negative electrode and simultaneously functions to cause an electrolyte solution to permeate into the electrode interior; and the interior layer plays a role of doping and de-doping more lithium and also functions as a current collector having a high conductivity.

Further Patent Literature 6 describes that a negative electrode material for a nonaqueous secondary battery contains composite graphite particles (A) made by graphitizing natural graphite and a binder and carbonaceous particles (B); the composite graphite particles (A) have a tap density of 0.5 g/cm$^3$ or higher and 1.5 g/cm$^3$ or lower, a BET specific surface area of 1 m$^2$/g or higher and 10 m$^2$/g or lower, and a particle median diameter of 5 μm or larger and 30 μm or smaller; the carbonaceous particles (B) are one or more selected from the group consisting of natural graphite, artificial graphite, resin-coated graphite and amorphous carbon; the active material density of an electrode fabricated by using such a negative electrode material is 1.8±0.03 g/cm$^3$; and the in-electrode porosity of 7.5% or higher and 30% or lower as obtained by measuring the cross-sectional image of the electrode. Patent Literature 6 describes that use of such a negative electrode material enables providing, even in the case where the density of the active material layer is made high, a nonaqueous secondary battery having a low initial charge and discharge irreversible capacity and a high capacity, and having excellent discharge load characteristics, charging acceptability, cycle characteristics and electrolyte solution permeability.

CITATION LIST

Patent Literature

Patent Literature 1: JP5270050B
Patent Literature 2: JP2005-294011A
Patent Literature 3: WO2010/113783
Patent Literature 4: JP2001-196095A
Patent Literature 5: JP08-138650A
Patent Literature 6: JP5407196B

SUMMARY OF INVENTION

Technical Problem

When the thickness enlargement and the density enhancement of a negative electrode are carried out in order to raise the capacity, the permeability of an electrolyte solution decreases and the acceptability of lithium ions during the charge time decreases. As a result, the problem of the lithium deposition occurs in some cases.

An object of the present invention is to provide a negative electrode for a lithium ion secondary battery improved in the lithium ion acceptability, and a lithium ion secondary battery using the negative electrode.

Solution to Problem

According to one aspect of the present invention:
there is provided a negative electrode for a lithium ion secondary battery, comprising a current collector and a negative electrode active material layer on the current collector,
wherein the negative electrode active material layer comprises:
a first composite particle comprising a first graphite core particle and a first non-graphite-based carbon material coating a surface thereof; and
a second composite particle comprising a second graphite core particle and a second non-graphite-based carbon material coating a surface thereof, and wherein
an average particle diameter $d_A$ ($D_{50}$) of the first composite particles is 5 to 30 μm;
an average particle diameter $d_B$ ($D_{50}$) of the second composite particles is 2 to 25 μm, and is smaller than the average particle diameter $d_A$ of the first composite particles;
the mixing ratio of the first composite particle A and the second composite particle B is 50:50 to 95:5 in mass ratio (A:B); and
a density of the negative electrode active material layer is 1.4 to 1.7 g/cm$^3$.

According to another aspect of the present invention, there is provided a lithium ion secondary battery comprising the above negative electrode, a positive electrode capable of occluding and releasing lithium ions, and a nonaqueous electrolyte solution.

Advantageous Effects of Invention

According to the exemplary embodiment, there can be provided a negative electrode for a lithium ion secondary battery improved in the lithium ion acceptability, and a lithium ion secondary battery using the negative electrode.

DESCRIPTION OF EMBODIMENT

Figure 1:
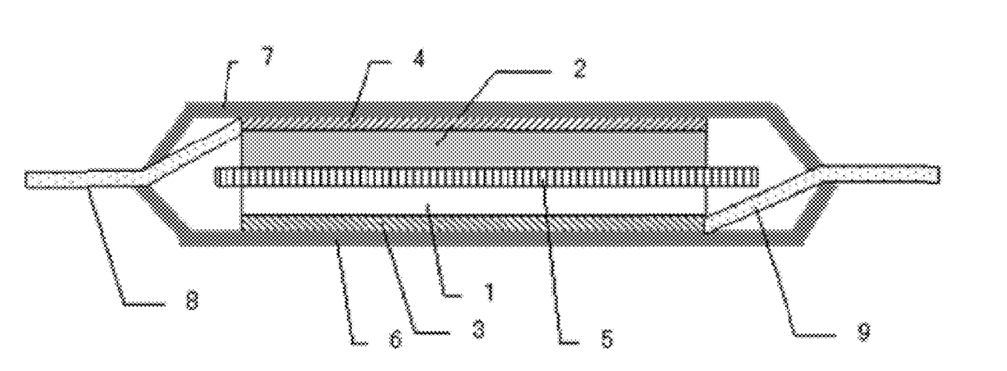
The FIGURE is a cross-sectional view to interpret one example of a lithium ion secondary battery according to the exemplary embodiment.

In fabrication of a negative electrode using a graphite-based active material, the capacity can be improved by raising the packing density of its negative electrode active material layer by pressing. When the surface vicinity (portion containing the surface of the active material layer) of the electrode is excessively compressed, however, the size of voids in the surface vicinity becomes smaller than that in the interior and the density in the thickness direction of the electrode becomes nonuniform. That is, in the electrode interior (active material layer portion in the vicinity of a current collector), the size of voids is large and the packing density is low; and in the surface vicinity of the electrode, the size of voids is small and the packing density is high. When the density of the surface vicinity of the electrode is too high, the permeability of an electrolyte solution decreases and the acceptability of lithium ions decreases. Then when the size of voids in the electrode interior remains large, the capacity cannot sufficiently be improved.

In the exemplary embodiment, by adding a second graphite-based active material material (second composite particle) harder and suitably smaller in particle diameter than a first graphite-based active material material (first composite particle) used as a main material, to the first graphite-based active material material, the uniformization and the enhancement of the density in the electrode can be achieved, and a high-capacity negative electrode improved in the acceptability of lithium ions can be obtained.

Hereinafter, the preferred exemplary embodiment will be described.

A negative electrode active material layer of a negative electrode according to the exemplary embodiment comprises a first composite particle comprising a first graphite core particle and a first non-graphite-based carbon material coating a surface thereof, and a second composite particle comprising a second graphite core particle and a second non-graphite-based carbon material coating a surface thereof. Here, the coating means that at least a part of the surface of the graphite core particle is coated with the non-graphite-based carbon material, and includes both of the case where a part of the surface of the graphite core particle is coated, and the case where the entire of the surface of the graphite core particle is coated. Preferably 70% or more of the surface of the graphite core particle is coated; more preferably 80% or more; and still more preferably 90% or more.

It is preferable that the mass proportion $R_B$ (coating amount B) of the second non-graphite-based carbon material in the second composite particle be higher than the mass proportion $R_A$ (coating amount A) of the first non-graphite-based carbon material in the first composite particle. In the active material layer comprising these active materials, since the coating amount B is larger than the coating amount A, the second composite particle is harder than the first composite particle. By mixing this hard second composite particles with the first composite particles, the uniformization and the enhancement of the density in the electrode can be achieved; the high-capacity negative electrode improved in the acceptability of lithium ions can be obtained; and also a battery excellent in the cycle characteristics can be obtained.

When an electrode is fabricated by using particles having a low hardness, since the electrode surface vicinity is excessively compressed and the particles of the surface vicinity deform, it is likely that the size of voids in the surface vicinity becomes smaller than that in the interior and the density then becomes higher. By contrast, since the pressing pressure is hardly sufficiently transmitted to the current collector vicinity of the interior, it is likely that voids are large and the density then is low. When the surface vicinity is partially excessively compressed and voids then become too small, the permeability of an electrolyte solution decreases and the acceptability of lithium ions decreases. Further, voids in the current collector vicinity of the interior are large and the effect of improving the density by pressing then becomes insufficient.

In the negative electrode according to the exemplary embodiment, since the first composite particles having a relatively low hardness are mixed with the second composite particles having a relatively high hardness, the pressing pressure is transmitted uniformly in the electrode thickness direction and the electrode having a uniform density can then be formed. As a result, the improvement of the permeability in the surface vicinity can improve the acceptability of lithium ions, and the improvement and the uniformization of the density over the whole active material layer including the current collector vicinity can improve the cycle characteristics.

Further since excessive deformation of particles in the electrode surface vicinity by the pressing is suppressed and suitable voids are formed in the electrode surface vicinity, the permeability of the nonaqueous electrolyte solution is improved and the amount of the electrolyte solution held can then be improved, which can contribute to the improvement of the cycle characteristics. Further as a result of the uniform transmission of the pressing pressure in the electrode, an increase (springback) in the electrode thickness by a residual stress after the pressing can also be suppressed and resultantly, a decrease in the electrode capacity also can be suppressed.

Hereinafter, a negative electrode according to the exemplary embodiment and a lithium ion secondary battery using the negative electrode will be specifically described.

(Core Material: First and Second Graphite Core Particles)

As core materials (first and second graphite core particles) of first and second composite particles contained in an active material material according to the exemplary embodiment, usual natural graphite and artificial graphite can be used. Graphite materials having an interplanar spacing $d_{002}$ of the (002) planes by X-ray diffractometry preferably in the range of 0.3354 to 0.340 nm, more preferably in the range of 0.3354 to 0.338 nm, can be used. Among these, a natural graphite ($d_{002}$=0.3354) is preferable from the viewpoint of the cost and the like. The first and second graphite core particles may be made of materials different from each other, or may be made of the same material.

The shape of the first and second graphite core particles is not especially limited, but for example, globulized particles, massive particles and scaly particles can be used, and globulized graphites can suitably be used. The shapes of the first and second graphite core particles may be ones different from each other, or may be the same one.

The average particle diameters of the first and second core particles can suitably be selected according to desired average particle diameters of the first and second composite particles, respectively. For example, from the viewpoint of the charge and discharge efficiency, the input and output characteristics and the like, the average particle diameter is especially preferably in the range of 1 to 30 μm. Here, the average particle diameter means a particle diameter (median diameter: $D_{50}$) at a cumulative value of 50% in a particle size distribution (in terms of volume) by a laser diffraction scattering method. The first and second core particles having a particle size distribution $D_{50}/D_5$, for example, in the range of 1.2 to 5, can be used. Here, $D_5$ means a particle diameter at a cumulative value of 5% in the particle size distribution (in terms of volume) by the laser diffraction scattering method.

The BET specific surface areas (based on measurements at 77K by a nitrogen adsorption method) of the first and second core particles are, respectively, from the viewpoint of the charge and discharge efficiency and the input and output characteristics, preferably, for example, in the range of 1 to 10 $m^2/g$.

(Coating Materials: First and Second Non-Graphite-Based Carbon Materials)

By coating the surface of the above-mentioned core materials (graphite core particles) with a non-graphite-based carbon material, the hardnesses of obtained composite particles can be raised according to the coating amount. Further the coating can suppress side reactions between the active material material and the electrolyte solution, and can improve the charge and discharge efficiency and then increase the reaction capacity.

The non-graphite-based carbon materials are carbon materials having no three-dimensional crystal regularity of graphite, and include turbostratic carbon materials and amorphous carbon materials, and also include, for example, glasslike carbons, and carbon materials whose crystallinity has not progressed due to their low heat treatment temperature. Among these non-graphite-based carbon materials, amorphous carbon materials having a relatively high hardness are preferable. The first and second non-graphite-based carbon materials may be materials different from each other, or may be the same material.

A method of coating the core material with the non-graphite-based carbon material can be carried out according to a usual method. For example, a method of depositing and heat-treating an organic substance on the core material surface, and film-forming methods such as a chemical vapor deposition method (CVD method), a sputtering method (for example, ion beam sputtering method), a vacuum deposition method, a plasma method and an ion plating method can be used.

In the method of depositing and heat-treating an organic substance on the core material surface, a method of depositing an organic substance on the core material surface includes a method of dry mixing the organic substance with the core material, and a method of mixing a solution of the organic substance with the core material and removing the solvent. As the organic substance, pitches such as petroleum pitches and coal tar pitches, and resins such as phenol resins, polyvinyl alcohol resins, furan resins, polystyrene resins, polyimide resins, epoxy resins, and resins of cellulose, sucrose and the like can be used. The carbonization by a heat treatment can be carried out in a non-oxidative atmosphere such as an argon gas atmosphere or a nitrogen gas atmosphere, under the temperature condition of, for example, 400 to 2,000° C., preferably 800 to 1,200° C., and in a heat treatment time of, for example, 0.5 hour to 12 hours, preferably 0.5 hour to 6 hours.

(Coating Amount A)

The coating amount A (the mass proportion $R_A$ of the non-graphite-based carbon material in the first composite particle) is preferably 0.1% by mass or higher, more preferably 0.2% by mass or higher, and still more preferably 0.5% by mass or higher. When the coating amount A is too small, the electrolytic solution becomes liable to decompose at active ends of the graphite, bringing about risks of generating gases and decreasing the cycle life.

Further the coating amount A ($R_A$) is smaller than the coating amount B, and can be set at 10% by mass or lower, and is preferably 5% by mass or lower, more preferably 4% by mass or lower, and still more preferably 3% by mass or lower. When the coating amount A is too large, it is likely that the initial capacity of a battery using the active material material decreases and the particles become hard and the compression density of the electrode then becomes difficult to raise.

(Coating Amount B)

The coating amount B (the mass proportion $R_B$ of the non-graphite-based carbon material in the second composite particle) is larger than the coating amount A, and is preferably 5% by mass or higher, more preferably 7% by mass or higher, and still more preferably 10% by mass or higher. When the coating amount B is too small, there arise risks of reducing the effects of improving the lithium ion acceptability and the cycle characteristics.

Further the coating amount B ($R_B$) is preferably 30% by mass or lower, and more preferably 20% by mass or lower. When the coating amount B is too large, it is likely that the initial capacity of a battery using the active material material decreases and the particles become hard and the compression density of the electrode then becomes difficult to raise.

The coating amounts A and B can be determined by a thermogravimetric analysis. More specifically, by using a thermogravimetric analyzer, the first and second composite particles are each heated at a predetermined temperature-rise rate up to about 900° C.; the weight change by combustion involved in the temperature-rise is measured; and the coating amounts A and B can be calculated by analyzing an obtained weight loss curve (the abscissa indicates temperatures, and the ordinate indicates weight changes). Weight loss due to combustion of the coating material (the non-graphite-based carbon material such as amorphous carbon) is observed on the low-temperature side, and weight loss due to combustion of the core material is observed on the high-temperature side. The coating amounts can be calculated from an integrated value on the low-temperature side and an integrated value on the high-temperature side of a differential curve (the abscissa indicates temperatures, and the ordinate indicates weight loss rates (%/K)) obtained from the weight loss curve.

(The Average Particle Diameters and the Specific Surface Areas of the First and Second Composite Particles)

The average particle diameter of the graphite-based active material material comprising the first and second composite particles is, from the viewpoint of the charge and discharge efficiency, the input and output characteristics and the like, preferably in the range of 2 to 40 μm, and more preferably in the range of 2 to 30 μm. Here, the average particle diameter means a particle diameter (median diameter: $D_{50}$) at a cumulative value of 50% in the particle size distribution (in terms of volume) by a laser diffraction scattering method.

Further it is preferable from the viewpoint of improving the cycle characteristics that the average particle diameter $d_B$ of the second composite particles be smaller than the average particle diameter $d_A$ of the first composite particles, but be a size sufficiently large to some extent. When the average particle diameter of the second composite particles having a relatively high hardness is excessively smaller than that of the first composite particles having a relatively low hardness, there arises such risk that the transmission function of the pressing pressure during the electrode fabrication comes to be hardly sufficiently exhibited and the effect of improving the cycle characteristics is then reduced. From such a viewpoint, the average particle diameter of the first composite particles is preferably in the range of 5 to 30 μm. The average particle diameter of the second composite particles is preferably in the range of 2 to 25 μm. The particle diameter ratio $d_B/d_A$ is preferably 0.6 or higher and lower than 1, more preferably 0.6 or higher and 0.9 or lower, and still more preferably 0.6 or higher and 0.8 or lower.

Provided that $D_{10}$, $D_{50}$ and $D_{95}$ represent the particle diameters at a cumulation of 10%, 50% and 95% from the fine particle size side in a cumulative particle size distribution, respectively, the ratio $D_{50}/D_{10}$ of $D_{50}$ and $D_{10}$ of the first composite particles is preferably 1.5 or lower; and the ratio $D_{95}/D_{10}$ of $D_{95}$ and $D_{10}$ of the first composite particles is preferably 1.7 or higher. Further the ratio $D_{50}/D_{10}$ of $D_{50}$ and $D_{10}$ of the first composite particles is preferably 1.0 or higher; and the ratio $D_{95}/D_{10}$ thereof is preferably 2.5 or lower.

On the other hand, the ratio $D_{50}/D_{10}$ of $D_{50}$ and $D_{10}$ of the second composite particles is preferably 1.3 or lower; and the ratio $D_{95}/D_{10}$ of $D_{95}$ and $D_{10}$ of the second composite particles is preferably lower than 1.7. Further the ratio $D_{50}/D_{10}$ of $D_{50}$ and $D_{10}$ of the second composite particles is preferably 0.8 or higher; and the ratio $D_{95}/D_{10}$ thereof is preferably 1.2 or higher.

The BET specific surface areas (based on measurements at 77K by a nitrogen adsorption method) of the negative electrode active material comprising the first and second composite particles are, from the viewpoint of the charge and discharge efficiency and the input and output characteristics, preferably in the range of 0.3 to 10 $m^2/g$, more preferably in the range of 0.5 to 10 $m^2/g$, and still more preferably in the range of 0.5 to 7.0 $m^2/g$.

Further the BET specific surface area of the first composite particles is preferably in the range of 0.9 $m^2/g$ or larger and 3.7 $m^2/g$ or smaller; and the BET specific surface area of the second composite particles is preferably in the range of 3.4 $m^2/g$ or larger and 6 $m^2/g$ or smaller.

(Linear Load)

It is preferable that the first and second composite particles satisfy the following conditions.

A linear load B necessary in order to provide a compression density of the second composite particles of 1.55 g/cm$^3$ is higher than a linear load A necessary in order to provide a compression density of the first composite particles of 1.55 g/cm$^3$.

Further the linear load A necessary in order to provide a compression density of the first composite particles of 1.55 g/cm$^3$ is preferably in the range of 0.3 tf/cm (2,942 N/cm) or higher and lower than 0.6 tf/cm (5,884 N/cm). Further the linear load B necessary in order to provide a compression density of the second composite particles of 1.55 g/cm$^3$ is preferably in the range of 0.8 tf/cm (7,845 N/cm) or higher and 1.5 tf/cm (14,710 N/cm) or lower. The linear load B is more preferably 1.0 tf/cm (9,807 N/cm) or higher, and is more preferably 1.2 tf/cm (11,768 N/cm) or lower.

The values of such linear loads have relations with the hardnesses of the first and second composite particles; and particles giving a higher value of the linear load are likely to give a higher hardness. Use of the first and second composite particles giving the above linear loads improves the acceptability of lithium ions and enables providing better cycle characteristics.

Here, the linear load is a value obtained by dividing a load applied to an electrode surface by a roll press machine by an electrode width. The electrode width corresponds to an electrode width (application width) in the roll width direction at a position where the electrode is installed in the pressing.

The compression density can be derived according to the following for an electrode obtained by punching an electrode out into a predetermined size after the pressing. Here, the electrode means one in which a slurry comprising the first or second composite particle is applied and dried on a current collector such as a foil to thereby form an applied layer in the electrode.

Surface density $A$=(a weight of the electrode–a weight of the current collector)/an area of the electrode Electrode density $D=A$/(a thickness of the electrode–a thickness of the current collector)

The electrode density D after the pressing thus obtained corresponds to the compression density.

The "linear load necessary in order to provide a compression density of 1.55 g/cm$^3$" can be determined, for example, by carrying out roll pressing at various loads, measuring compression densities of the electrode after the each pressing, and using a load when the compression density becomes 1.55 g/cm$^3$.

(Mixing Ratio of the First Composite Particles and the Second Composite Particles)

The mixing ratio of the first graphite particles A and the second graphite particles B is, in mass ratio (A:B), preferably 50:50 to 95:5. That is, the content of the second composite particles with respect to the total of the first composite particles and the second composite particles is preferably 5% by mass or higher, and more preferably 10% by mass or higher. When the content of the second composite particles is too low, there arises such risk that the effect of improving the acceptability of lithium ions and the cycle characteristics becomes small. Further the content of the second composite particles with respect to the total of the first composite particles and the second composite particles is preferably 50% by mass or lower, more preferably 40% by mass or lower, and still more preferably 30% by mass or lower. When the content of the second composite particles is too high, (that is, the content of the first composite particles is too low), there arises such risk that the initial capacity of a battery decreases; the irreversible capacity in the initial period of the cycle increases; and the gas generation amount increases and the cycle characteristics and the storage characteristics then deteriorate.

(A Method for Producing the Graphite-Based Active Material)

The graphite-based active material according to the exemplary embodiment can be produced by mixing the first and second composite particles described above by a well-known mixing method. The graphite-based active material may be mixed with other active material materials as necessary in the range of not impairing the desired advantage. The content of the first and second composite particles to the whole graphite-based active material is preferably 90% by mass or higher, and more preferably 95% by mass or higher. The graphite-based active material according to the exemplary embodiment can be constituted only of the first and second composite particles.

(The Negative Electrode for a Lithium Ion Secondary Battery)

The negative electrode for a lithium ion secondary battery according to the exemplary embodiment can be obtained, for example, by forming the negative electrode active material layer comprising the above graphite-based active material and a binder on the negative electrode current collector. The density of the negative electrode active material layer is preferably 1.4 to 1.7 g/cm$^3$, more preferably 1.45 to 1.7 g/cm$^3$, and still more preferably 1.5 to 1.7 g/cm$^3$. The density can be determined similarly to the above compression density. Further the coating amount (after drying) per one surface of the current collector of the negative electrode active material layer is preferably 9 mg/cm$^2$ or larger from the point of providing a sufficient capacity, and preferably 20 mg/cm$^2$ or smaller from the point of the finish and the drying time, and can be set, for example, in the range of 9 to 15 mg/cm$^2$.

The negative electrode active material layer can be formed by a usual slurry application method. Specifically, a slurry containing the negative electrode active material, the binder and a solvent is prepared, and applied on the negative electrode current collector, dried and as required, pressed to thereby obtain the negative electrode. An application method of the negative electrode slurry includes a doctor blade method, a die coater method and a dip coating method. The negative electrode may be obtained by previously forming the negative electrode active material layer, and thereafter forming, as the current collector, a thin film of aluminum, nickel or an alloy thereof by vapor deposition, sputtering or the like.

The binder for the negative electrode is not especially limited, but includes polyvinylidene fluoride (PVdF), vinylidene fluoride-hexafluoropropylene copolymers, vinylidene fluoride-tetrafluoroethylene copolymers, styrene-butadiene copolymer rubber, polytetrafluoroethylene, polypropylene, polyethylene, polyimide, polyamideimide, methyl (meth)acrylate, ethyl (meth)acrylate, butyl (meth)acrylate, (meth)acrylonitrile, isoprene rubber, butadiene rubber and fluororubber. As the slurry solvent, N-methyl-2-pyrrolidone (NMP) and water can be used. In the case of using water as the solvent, carboxymethyl cellulose, methyl cellulose, hydroxymethyl cellulose, ethyl cellulose and polyvinyl alcohol can further be used as a thickener.

The content of the binder for the negative electrode is, from the viewpoint of the binding power and the energy density, which are in a tradeoff relation, with respect to 100 parts by mass of the negative electrode active material, preferably in the range of 0.1 to 30 parts by mass, more preferably in the range of 0.5 to 25 parts by mass, and still more preferably in the range of 1 to 20 parts by mass.

The negative electrode current collector is not especially limited, but is, from the viewpoint of the electrochemical stability, preferably copper, nickel, stainless steel, molybdenum, tungsten, tantalum or an alloy containing two or more thereof. The shape thereof includes foils, flat plates and mesh forms.

(Lithium Ion Secondary Battery)

The lithium ion secondary battery according to the exemplary embodiment comprises the above negative electrode, a positive electrode and an electrolyte.

The positive electrode can be fabricated, for example, by preparing a slurry containing a positive electrode active material, a binder and a solvent (as required, further a conductive auxiliary agent), and applying and drying the slurry on a positive electrode current collector, and as required, pressing the dried slurry to thereby form a positive electrode active material layer on the positive electrode current collector.

The positive electrode active material is not especially limited, but for example, lithium composite oxides and iron lithium phosphate can be used. The lithium composite oxides include lithium manganate ($LiMn_2O_4$); lithium cobaltate ($LiCoO_2$); lithium nickelate ($LiNiO_2$); compounds obtained by substituting at least a part of manganese, cobalt or nickel of these lithium compounds with another metal element such as aluminum, magnesium, titanium or zinc; nickel-substituted lithium manganates obtained by substituting a part of manganese of lithium manganate with at least nickel; cobalt-substituted lithium nickelates obtained by substituting a part of nickel of lithium nickelate with at least cobalt; compounds obtained by substituting a part of manganese of the nickel-substituted lithium manganates with another metal (for example, at least one of aluminum, magnesium, titanium and zinc); and compounds obtained by substituting a part of nickel of the cobalt-substituted lithium nickelate with another metal element (for example, at least one of aluminum, magnesium, titanium, zinc and manganese). These lithium composite oxides may be used singly or as a mixture of two or more. With respect to the average particle diameter of the positive electrode active material, from the viewpoint of the reactivity with an electrolyte solution, the rate characteristics and the like, the positive electrode active material having an average particle diameter, for example, in the range of 0.1 to 50 µm, preferably in the range of 1 to 30 µm, and still more preferably in the range of 5 to 25 µm can be used. Here, the average particle diameter means a particle diameter (median diameter: $D_{50}$) at a cumulative value of 50% in a particle size distribution (in terms of volume) by a laser diffraction scattering method.

The binder for the positive electrode is not especially limited, and the same ones as the binder for the negative electrode can be used. Among the ones, from the viewpoint of the versatility and the low cost, polyvinylidene fluoride is preferable. The content of the binder for the positive electrode is, from the viewpoint of the binding power and the energy density, which are in a tradeoff relation, with respect to 100 parts by mass of the positive electrode active material, preferably in the range of 1 to 25 parts by mass, more preferably in the range of 2 to 20 parts by mass, and still more preferably in the range of 2 to 10 parts by mass. The binders other than polyvinylidene fluoride (PVdF) include vinylidene fluoride-hexafluoropropylene copolymers, vinylidene fluoride-tetrafluoroethylene copolymers, styrene-butadiene copolymer rubber, polytetrafluoroethylene, polypropylene, polyethylene, polyimide and polyamideimide. As the slurry solvent, N-methyl-2-pyrrolidone (NMP) can be used.

The positive electrode current collector is not especially limited, but from the viewpoint of the electrochemical stability, for example, aluminum, titanium, tantalum, stainless steel (SUS), another valve metal or an alloy thereof can be used. The shape thereof includes foils, flat plates and mesh forms. Aluminum foils can especially suitably be used.

When the positive electrode is fabricated, for the purpose of decreasing the impedance, the conductive auxiliary agent may be added. The conductive auxiliary agent includes carbonaceous fine particles of graphite, carbon black, acetylene black and the like.

As the electrolyte, a nonaqueous electrolyte solution in which a lithium salt is dissolved in one or two or more nonaqueous solvents can be used. The nonaqueous solvents are not especially limited, but examples thereof include cyclic carbonates such as ethylene carbonate (EC), propylene carbonate (PC), butylene carbonate (BC) and vinylene carbonate (VC); chain carbonates such as dimethyl carbonate (DMC), diethyl carbonate (DEC), ethyl methyl carbonate (EMC) and dipropyl carbonate (DPC); aliphatic carbonate esters such as methyl formate, methyl acetate and ethyl propionate; γ-lactones such as γ-butyrolactone; chain ethers such as 1,2-ethoxyethane (DEE) and ethoxymethoxyethane (EME); and cyclic ethers such as tetrahydrofuran and 2-methyltetrahydrofuran. As other nonaqueous solvents, aprotic organic solvents such as dimethyl sulfoxide, 1,3-dioxolane, dioxolane derivatives, formamide, acetamide, dimethylformamide, acetonitrile, propionitrile, nitromethane, ethylmonoglyme, phosphate triesters, trimethoxymethane, sulfolane, methylsulfolane, 1,3-dimethyl-2-imidazolidinone, 3-methyl-2-oxazolidinone, propylene carbonate derivatives, tetrahydrofuran derivatives, ethyl ether, 1,3-propanesultone, anisole and N-methylpyrrolidone can be used.

The lithium salt to be dissolved in the nonaqueous solvent is not especially limited, but examples thereof include $LiPF_6$, $LiAsF_6$, $LiAlCl_4$, $LiClO_4$, $LiBF_4$, $LiSbF_6$, $LiCF_3SO_3$, $LiCF_3CO_2$, $Li(CF_3SO_2)_2$, $LiN(CF_3SO_2)_2$, and lithium bisoxalatoborate. These lithium salts can be used singly or as a combination of two or more. Further as a nonaqueous electrolyte, a polymer component may be contained.

A separator can be provided between the positive electrode and the negative electrode. As the separator, a porous film composed of a polyolefin such as polypropylene or polyethylene, a fluororesin such as polyvinylydene fluoride, a polyimide or the like, woven fabric or nonwoven fabric can be used.

The battery shape includes cylindrical, rectangular, coin type, button type and laminate type shapes. In the case of the laminate-type battery, there is preferably used a laminate film as an outer package accommodating the positive electrode, the separator, the negative electrode and the electrolyte. The laminate film contains a resin base material, a metal foil layer, and a heat-fusible layer (sealant). The resin base material includes polyester and nylon; the metal foil layer includes aluminum, aluminum alloy and titanium foils. The material of the heat-fusible layer includes thermoplastic polymeric materials such as polyethylene, polypropylene and polyethylene terephthalate. Further the resin base material layer and the metal foil layer are each not limited to of one layer, and may be of two or more layers. From the viewpoint of the versatility and the cost, aluminum laminate films are preferable.

The positive electrode, the negative electrode and the separator arranged therebetween are accommodated in outer packaging containers composed of laminate films; the electrolyte solution is injected; and the containers are sealed. There may be made a structure in which an electrode group in which a plurality of electrode pairs are laminated is accommodated in the containers.

A cross-sectional view of one example (laminate-type) of the lithium ion secondary battery according to the exemplary embodiment is shown in The FIGURE. As shown in The FIGURE, the lithium ion secondary battery according to the exemplary embodiment has a positive electrode comprising a positive electrode current collector 3 composed of a metal such as an aluminum foil and a positive electrode active material layer 1 containing a positive electrode active material provided thereon, and a negative electrode comprising a negative electrode current collector 4 composed of a metal such as a copper foil and a negative electrode active material layer 2 containing a negative electrode active material provided thereon. The positive electrode and the negative electrode are laminated through a separator 5 composed of a nonwoven fabric, a polypropylene microporous membrane or the like so that the positive electrode active material layer 1 and the negative electrode active material layer 2 face each other. The pair of electrodes is accommodated in a container formed of outer packages 6, 7 such as an aluminum laminate film. A positive electrode tab 9 is connected to the positive electrode current collector 3, and a negative electrode tab 8 is connected to the negative electrode current collector 4. These tabs are led outside the container. The electrolyte solution is injected in the container, which is then sealed. There may be made a structure in which an electrode group in which a plurality of electrode pairs are laminated is accommodated in the container.

EXAMPLES

Example 1

As a negative electrode active material, there was prepared composite particles A (average particle diameter $d_A$ ($D_{50}$): 16 μm, specific surface area: 3.5 m$^2$/g, globulized to a circularity of 0.7 or higher) obtained by coating graphite particles with an amorphous carbon, and composite particles B (average particle diameter $d_B$ ($D_{50}$): 10 μm, specific surface area: 4.0 m$^2$/g, globulized to a circularity of 0.7 or higher) having a smaller particle diameter and a larger coating amount of an amorphous carbon than the particles A and being obtained by coating graphite particles with the amorphous carbon. 90% by mass of the particles A and 10% by mass of the particles B were mixed to thereby make the negative electrode active material.

The mass proportion $R_A$ of the amorphous carbon in the composite particles A was 3% by mass, and the mass proportion $R_B$ of the amorphous carbon in the composite particles B was 10% by mass.

The linear load A necessary in order to provide a compression density of the composite particles A of 1.55 g/cm$^3$ was 0.55 tf/cm (5,394 N/cm), and the linear load B necessary in order to provide a compression density of the composite particles B of 1.55 g/cm$^3$ was 1.1 tf/cm (10.787 N/cm).

$D_{50}/D_{10}$ of the composite particles A was 1.3, and $D_{95}/D_{10}$ thereof was 1.9; and $D_{50}/D_{10}$ of the composite particles B was 1.1, and $D_{95}/D_{10}$ thereof was 1.6.

Further as a conductive auxiliary agent, fine particles (carbon black) having an average particle diameter ($D_{50}$) of 100 nm or smaller was prepared, and added to the negative electrode active material. The addition amount of the conductive auxiliary agent with respect to the negative electrode active material was made to be 0.3% by mass.

A mixture of the negative electrode active material and the conductive auxiliary agent was mixed with a 1.0-wt % aqueous solution of a carboxymethyl cellulose (thickener), and mixed further with a styrene-butadiene copolymer (binder) to thereby prepare a slurry. The addition rate of the binder with respect to the negative electrode active material was made to be 2.0% by mass.

The slurry was applied on one surface of a copper foil of 10 μm in thickness, and the applied film was dried (the coating amount after the drying per one surface: 12 mg/cm$^2$). Thereafter, the resultant was roll-pressed so that the density of the applied film (negative electrode active material layer) after the drying became 1.55 g/cm$^3$ to thereby obtain negative electrode sheets of 33×45 mm.

A lithium composite oxide containing Ni, Co and Mn having a layer crystal structure as a positive electrode active material was dispersed in N-methyl-pyrrolidone in which a polyvinylidene fluoride (binder) was dissolved to thereby prepare a slurry. The addition rate of the binder was made to be 3% by mass to the positive electrode active material. The slurry was coated on both surfaces of an aluminum foil, and the applied film was dried (the coating amount after the drying per one surface: 20 mg/cm$^2$). Thereafter, the resultant was roll-pressed so that the density of the applied film (positive electrode active material layer) after the drying became 3.45 g/cm$^3$ to thereby obtain a positive electrode sheet of 30×40 mm.

The negative electrode sheets were stacked on both sides of the positive electrode sheet so that the positive electrode active material layer and the negative electrode active material layer faced each other through a separator composed of a porous polyethylene film of 25 μm in thickness. An extraction electrode for the positive electrode was installed and an extraction electrode for the negative electrode was installed; thereafter, the laminated body was wrapped with laminate films; an electrolyte solution was injected therein; and the laminate films were sealed. The electrolyte solution was one in which a mixed solution (EC/DEC=3/7 (in volume ratio)) of EC and DEC was used as a solvent, and 1 mol/L of LiPF$_6$ as a lithium salt was dissolved in the mixed solvent.

The obtained negative electrode and battery were evaluated for the permeability, the lithium ions acceptability and the cycle characteristics.

Example 2

A negative electrode was fabricated as in Example 1, except for altering the mixing amount of the particles B to 20% by mass, and a secondary battery was fabricated using the negative electrode as in Example 1. The obtained negative electrode and battery were evaluated as in Example 1.

Example 3

A negative electrode was fabricated as in Example 1, except for altering the mixing amount of the particles B to 30% by mass, and a secondary battery was fabricated using the negative electrode as in Example 1. The obtained negative electrode and battery were evaluated as in Example 1.

Example 4

A negative electrode was fabricated as in Example 1, except for altering the mixing amount of the particles B to 50% by mass, and a secondary battery was fabricated using the negative electrode as in Example 1. The obtained negative electrode and battery were evaluated as in Example 1.

Comparative Example 1

A negative electrode was fabricated as in Example 1, except for mixing no composite particles B, and a secondary battery was fabricated using the negative electrode as in Example 1. The obtained negative electrode and battery were evaluated as in Example 1.

(Measurement of the Permeating Time of the Electrolyte Solution/Evaluation of the Permeability)

The electrolyte solution (in which 1.0 mol/L of $LiPF_6$ was dissolved in the carbonate solvent (EC/DEC=3/7 (in volume ratio)) was dropped (dropping amount: 1 µl) on the applied film of the negative electrode; and the time (sec) from a time point of the dropping to a time point when the whole of the dropped solution just had permeated was measured.

(Measurement of the Degree of Li Deposition/Evaluation of the Lithium Ion Acceptability)

The battery was charged at a rate of 1.4 ItA up to 3.0 V by using a charge and discharge apparatus, thereafter connected to a 1-W miniature lamp and discharged (constant current discharge) down to 0 V, and thereafter disassembled to take out the negative electrode; and the degree of Li deposition (areal ratio of the portions of Li deposition) was measured by using image analyzer.

Here, the degree of Li deposition was a ratio with Comparative Example 1 as the reference (100); and in Comparative Example 1, Li deposited on the nearly entire surface.

(Evaluation of the Cycle Characteristics)

There was carried out at 25° C. a charge and discharge cycle test (cycle-rate: 1C, CC-CV charge, upper limit voltage: 4.15 V, CC discharge, lower limit voltage: 2.5 V); and the capacity retention rate after 500 cycles (the proportion of a discharge capacity at the 500th cycle to a discharge capacity at the first cycle) was determined.

TABLE 1

| | Mixing Amount of Particles B (% by mass) | Electrolyte Solution Permeating Time (sec) | Degree of Li Deposition | Capacity Retention Rate (%) |
|---|---|---|---|---|
| Example 1 | 10 | 36 | 50 | 84 |
| Example 2 | 20 | 36 | 10 | 86 |
| Example 3 | 30 | 35 | 0 | 86 |
| Example 4 | 50 | 36 | 0 | 84 |
| Comparative Example 1 | 0 | 54 | 100 | 82 |

As is clear from comparison of Examples 1 to 4 with Comparative Example 1, it is found that by mixing the particles A and the particles B, the electrolyte solution permeating time and the degree of Li deposition became low and the lithium ion acceptability was improved. It is also found that the secondary battery using such a negative electrode was high in the capacity retention rate and excellent in the cycle characteristics.

In the foregoing, the present invention has been described with reference to the exemplary embodiments and the Examples; however, the present invention is not limited to the exemplary embodiments and the Examples. Various modifications understandable to those skilled in the art may be made to the constitution and details of the present invention within the scope thereof.

REFERENCE SIGNS LIST

1 POSITIVE ELECTRODE ACTIVE MATERIAL LAYER
2 NEGATIVE ELECTRODE ACTIVE MATERIAL LAYER
3 POSITIVE ELECTRODE CURRENT COLLECTOR
4 NEGATIVE ELECTRODE CURRENT COLLECTOR
5 SEPARATOR
6 LAMINATE OUTER PACKAGE
7 LAMINATE OUTER PACKAGE
8 NEGATIVE ELECTRODE TAB
9 POSITIVE ELECTRODE TAB

The invention claimed is:

1. A negative electrode for a lithium ion secondary battery, comprising a current collector and a negative electrode active material layer on the current collector,
wherein the negative electrode active material layer comprises:
a first composite particle comprising a first graphite core particle and a first non-graphite-based carbon material coating a surface thereof; and
a second composite particle comprising a second graphite core particle and a second non-graphite-based carbon material coating a surface thereof, and wherein
an average particle diameter $d_A$ ($D_{50}$) of the first composite particles is 5 to 30 µm;
an average particle diameter $d_B$ ($D_{50}$) of the second composite particles is 2 to 25 µm, and is smaller than the average particle diameter $d_A$ of the first composite particles;
a mixing ratio of the first composite particle A and the second composite particle B is 50:50 to 95:5 in mass ratio (A:B); and
a density of the negative electrode active material layer is 1.4 to 1.7 g/cm$^3$, and
wherein, provided that D10, D50 and D95 represent particle diameters at a cumulation of 10%, 50% and 95% from the fine particle size side in a cumulative particle size distribution, respectively,
a ratio D50/D10 of D50 and D10 of the first composite particles is 1.5 or lower;
a ratio D95/D10 of D95 and D10 of the first composite particles is 1.7 or higher;
a ratio D50/D10 of D50 and D10 of the second composite particles is 1.3 or lower; and
a ratio D95/D10 of D95 and D10 of the second composite particles is lower than 1.7.

2. The negative electrode according to claim 1, wherein a mass proportion $R_B$ of the second non-graphite-based carbon material in the second composite particle is 5 to 30% by mass, and is higher than a mass proportion $R_A$ of the first non-graphite-based carbon material in the first composite particle.

3. The negative electrode according to claim 2, wherein the mass proportion $R_A$ of the first non-graphite-based carbon material in the first composite particle is 0.1 to 10% by mass.

4. The negative electrode according to claim 2, wherein the mass proportion $R_A$ of the first non-graphite-based carbon material in the first composite particle is 0.1 to 5% by mass.

5. The negative electrode according to claim 1, wherein a linear load B necessary in order to provide a compression density of the second composite particles of 1.55 g/cm$^3$ is higher than a linear load A necessary in order to provide a compression density of the first composite particles of 1.55 g/cm³.

6. The negative electrode according to claim 1, wherein the first graphite core particle and the second graphite core particle each comprise a natural graphite.

7. The negative electrode according to claim 1, wherein the first non-graphite-based carbon material and the second non-graphite-based carbon material each comprise an amorphous carbon.

8. The negative electrode according to claim 1, wherein a particle diameter ratio $d_B/d_A$ is 0.6 or higher and lower than 1.

9. The negative electrode according to claim 1, wherein the first composite particle and the second composite particle each have a circularity of 0.7 or higher.

10. The negative electrode according to claim 1, wherein
a BET specific surface area of the first composite particle is 3.7 m²/g or smaller; and
a BET specific surface area of the second composite particle is 6 m²/g or smaller.

11. The negative electrode according to claim 1, wherein the BET specific surface area of the first composite particle is 0.9 m²/g or larger.

12. The negative electrode according to claim 1, wherein the BET specific surface area of the second composite particle is 3.4 m²/g or larger.

13. The negative electrode according to claim 1, wherein a coating amount (after drying) per one surface of the current collector of the active material layer is 9 mg/cm' or larger.

14. The negative electrode according to claim 1, wherein a particle diameter ratio $d_B/d_A$ is 0.6 or higher and lower than 1, and
a mass proportion $R_B$ of the second non-graphite-based carbon material in the second composite particle is 7 to 30% by mass, and is higher than a mass proportion $R_A$ of the first non-graphite-based carbon material in the first composite particle.

15. The negative electrode according to claim 14, wherein the mass proportion $R_B$ of the second non-graphite-based carbon material in the second composite particle is 10 to 30% by mass, and is higher than the mass proportion $R_A$ of the first non-graphite-based carbon material in the first composite particle.

16. The negative electrode according to claim 14, wherein the mass proportion $R_B$ of the second non-graphite-based carbon material in the second composite particle is 7 to 20% by mass, and is higher than the mass proportion $R_A$ of the first non-graphite-based carbon material in the first composite particle.

17. The negative electrode according to claim 14, wherein the first graphite core particle and the second graphite core particle are each globulized particle.

18. A lithium ion secondary battery, comprising a negative electrode according to claim 1, a positive electrode capable of occluding and releasing lithium ions, and a nonaqueous electrolyte solution.

* * * * *